US012750103B2

(12) United States Patent
Bahceci et al.

(10) Patent No.: US 12,750,103 B2
(45) Date of Patent: Sep. 29, 2026

(54) SPATIAL AUDIO ASSISTED BEAMFORMING FOR COMMUNICATIONS IN SAFE MODE

(71) Applicant: Telefonaktiebolaget LM Ericsson (publ), Stockholm (SE)

(72) Inventors: Israfil Bahceci, Kanata (CA); Hamza Sokun, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 328 days.

(21) Appl. No.: 18/570,155

(22) PCT Filed: Jun. 15, 2021

(86) PCT No.: PCT/IB2021/055278

§ 371 (c)(1),
(2) Date: Dec. 14, 2023

(87) PCT Pub. No.: WO2022/263883

PCT Pub. Date: Dec. 22, 2022

(65) Prior Publication Data

US 2024/0275444 A1 Aug. 15, 2024

(51) Int. Cl.
*H04B 7/06* (2006.01)
*H04B 7/08* (2006.01)
*H04B 11/00* (2006.01)

(52) U.S. Cl.
CPC ........... *H04B 7/0617* (2013.01); *H04B 7/086* (2013.01); *H04B 11/00* (2013.01)

(58) Field of Classification Search
CPC ....... H04B 7/0617; H04B 7/086; H04B 11/00
USPC .......................................................... 370/329
See application file for complete search history.

(56) References Cited

U.S. PATENT DOCUMENTS

2007/0225000 A1 9/2007 Cleveland
2018/0167927 A1* 6/2018 Beattie, Jr. ............ H04W 72/51
2018/0331742 A1* 11/2018 Yum .................... H04B 7/0417

FOREIGN PATENT DOCUMENTS

WO 2022195331 A1 9/2022

OTHER PUBLICATIONS

International Search Report and Written Opinion dated Mar. 23, 2022 for International Application No. PCT/IB2021/055278 filed Jun. 15, 2021, consisting of 10-pages.

(Continued)

*Primary Examiner* — Hermon Asres
(74) *Attorney, Agent, or Firm* — Weisberg I.P. Law, P.A.

(57) ABSTRACT

A method and network node for spatial audio assisted radio frequency (RF) beamforming for millimeter wave and terahertz communications in safe mode are disclosed. According to one aspect, a method in a network node includes triggering a wireless device (WD) to transmit at least one acoustic pulse, the triggering being prior to entering a safe mode of operation. The method also includes determining a direction of arrival of the at least one acoustic pulse received from the WD via the microphone array. The method further includes determining an RF beam for communication with the WD based at least in part on the determined direction of arrival. Transmission to the WD may occur on the determined RF beam.

18 Claims, 4 Drawing Sheets

(56) References Cited

OTHER PUBLICATIONS

L.C. Godara; Application of Antenna Arrays to Mobile Communications, Part II: Beam-Forming and Direction-of-Arrival Considerations; Proceedings of the IEEE, vol. 85, No. 8; Aug. 1997, consisting of 51-pages.

B. Rafaely; Analysis and Design of Spherical Microphone Arrays; IEEE Transactions on Speech and Audio Processing, vol. 13, No. 1; Jan. 2005, consisting of 9-pages.

J. Chen et al.; Precoder Feedback versus Channel Feedback in Massive MIMO under User Cooperation; 2015 49th Asilomar Conference on Signals, Systems and Computers; 2015, consisting of 5-pages.

* cited by examiner

SPATIAL AUDIO ASSISTED BEAMFORMING FOR COMMUNICATIONS IN SAFE MODE

CROSS-REFERENCE TO RELATED APPLICATION

This application is a Submission Under 35 U.S.C. § 371 for U.S. National Stage Patent Application of International Application Number: PCT/IB2021/055278, filed Jun. 15, 2021 entitled "SPATIAL AUDIO ASSISTED BEAMFORMING FOR COMMUNICATIONS IN SAFE MODE," the entirety of which is incorporated herein by reference.

TECHNICAL FIELD

This disclosure relates to wireless communication and in particular, to spatial audio assisted radio frequency (RF) beamforming for millimeter wave and terahertz (THz) communications in safe mode.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Radios with antenna arrays are capable of beamforming. Beamforming is a general concept where the signal is transmitted from multiple locations after being weighted with appropriate complex weights based on element location relative to a fixed position. Typically, the fixed position is set as one of the antenna element positions on which the signal is being transmitted. The coverage shape of the transmission is managed via the complex weights. This concept has found significant use in acoustics communications, radar and wireless communications. In various devices, microphone arrays are deployed to control the direction of received or emitted audio signals. In wireless communications, both access points and mobiles are equipped with multiple antennas where beamforming can be used to improve the desired signal and/or cancel undesired interference towards selected directions. RF frequency band varies significantly from HF band all the way to terra-hertz spectrum.

In order to benefit from beamforming, the transmitter needs to calculate the complex phases to create the desired beam shape. In some cases, the transceiver may have means of estimating the channels and deriving those weights. In some other cases, however, the network protocol may not have the means to estimate the channel and may fall back to common beam transmissions. For example, in 3GPP millimeter wave (mmWave) communications, during certain periods of transmissions, the synchronicity between the transmitters and receiver may be lost for a prolonged period of time at which point they need to undergo a safe mode operation where the achievable throughput performance degrades significantly. An example of when safe mode operations are triggered in 3GPP mmWave communications is when several consecutive CSI reports are missed, resulting in discontinuance of beam management. Thus, a safe mode operation has reduced performance.

When the transmitter loses access to training protocols based on which the beamforming weights are estimated, the link falls back typically to a non-multiple input multiple output (non-MIMO) transmission mode to create wider beams to reach the target receivers. Equipping the radio with a large-array and reducing the transmission to a common beam is disadvantageous in most cases, whether it is during normal operation or it is during a recovery phase.

In some other cases, the reliability of methods to determine beamforming weights may become critical in achieving the desired coverage shape. Radio frequency (RF) characteristics and design accuracies significantly change across these RF bands and proper protocols are required to determine the complex weights. The reliability of RF beamforming may also vary vastly due to the frequency dependency of the medium on electromagnetic waves. As one gets to mmWave frequencies and higher, radio waves suffer from huge propagation loss and atmospheric absorption, so that the cell coverage area shrinks significantly. Thus, at mmWave frequencies and higher, highly directional transmissions enabled by beamforming may be important. Falling back to a common beam transmission mode may result in loss of communication and restart of beam management protocols (which is a resource and time-consuming procedure).

SUMMARY

Some embodiments advantageously provide a method and system for spatial audio assisted radio frequency (RF) beamforming for millimeter wave and Tera Hertz communications in safe mode.

In order to avoid the complete lack of MIMO mode operation that occurs during safe mode operational periods in known methods, and/or during the periods where the usual beamformer estimation procedures become less reliable, some embodiments provide an emergency-mode beamforming procedure where acoustics array are employed.

Beamforming in most cases reduces to determining the desired directions and undesired directions and steering one or more beams in the desired directions while steering one or more nulls in the undesired directions. Any additional information to determine the directions contribute to more accurate beam steering and null steering. Some embodiments provide an audio-RF heterogenous beamforming architecture which includes an access point and a microphone array collocated with the RF antenna array of the access point. The access point, which hereinafter is referred to as a network node, can trigger acoustics-based direction acquisition. A beam management entity of the network node (e.g., during beam-refinement periods) can combine the information obtained from an out-of-band acoustic array and an in-band RF signal. The information from an acoustic array can be mapped to a spatial angle direction. Then, a beam-forming mode of operation may be performed during safe mode procedures or during protocol periods where the transmitter loses access to channel state measurements. In cases where limited in-band channel estimation available, some embodiments include combining acoustics-based beamforming information with beamforming information derived from the usual channel state information (CSI) estimation procedure. In some embodiments, a selective direction information combination includes determining acoustic signal quality and RF signal quality to be used for direction estimation. The use of comparison and a weighted-beam approach may be employed where the direction of an RF beam can be based on an RF signal, or acoustic signal, or may be based on a both the RF signal and the acoustic signal.

According to one aspect, a method for beamforming at a network node configured to communicate with a plurality of WDs. The network node has a microphone array. The method includes triggering a WD to transmit at least one acoustic pulse and determining a direction of arrival of the at least one acoustic pulse received from the WD via the microphone array. The method also includes determining a radio frequency, RF, beam for communication with the WD based at least in part on the determined direction of arrival, and transmitting to the WD on the determined RF beam.

According to this aspect, in some embodiments, the determined RF beam is based at least in part on a beam index corresponding to the determined direction of arrival, the beam index being based at least in part on a weighted average of beam steering vectors. In some embodiments, the determined RF beam is based at least in part on a beam index corresponding to the determined direction of arrival, the beam index being based at least in part on a largest eigenvector of a weighted singular value decomposition, SVD, matrix. In some embodiments, the determined RF beam is based at least in part on a beam index corresponding to the determined direction of arrival, the beam index being based at least in part on a beam synthesis process to determine an RF beam in a direction toward the WD. In some embodiments, determining an RF beam based at least in part on the determined direction of arrival is performed when a channel state information, CSI, is not available. In some embodiments, determining an RF beam based at least in part on the determined direction of arrival is performed when a P2 report from the WD is not received within an expected time slot, the P2 report indicating which of a plurality of RF beams is associated with the WD. In some embodiments, determining an RF beam based at least in part on the determined direction of arrival is performed when a P2 report from the WD is deemed to be unreliable, the P2 report indicating which of a plurality of RF beams is associated with the WD. In some embodiments, the P2 report is based at least in part on a downlink control information, DCI, format DCI_0_1. In some embodiments, the method also includes adjusting a margin of a link adaptation process based at least in part on a reliability or noise level of a beam index estimation module. In some embodiments, the method further includes switching an outer loop link adaptation process to conservative mode, where in the conservative mode, a signal to noise ratio, SNR, is not increased in response to receipt of a non-acknowledgment, NACK, from the WD. In some embodiments, the triggering is prior to entering a safe mode of operation.

According to another aspect, a network node is configured to communicate with a plurality of WDs. The network node includes a microphone array configured to receive an acoustic pulse from a WD. The network node also includes processing circuitry configured to trigger the WD to transmit at least one acoustic pulse, and determine a direction of arrival of the at least one acoustic pulse received from the WD via the microphone array. The processing circuitry is also configured to determine a radio frequency, RF, beam for communication with the WD based at least in part on the determined direction of arrival. The network node also includes a radio interface configured transmit to the WD on the determined RF beam.

According to this aspect, in some embodiments, the determined RF beam is based at least in part on a beam index corresponding to the determined direction of arrival, the beam index being based at least in part on a weighted average of beam steering vectors. In some embodiments, the determined RF beam is based at least in part on a beam index corresponding to the determined direction of arrival, the beam index being based at least in part on a largest eigenvector of a weighted singular value decomposition, SVD, matrix. In some embodiments, the determined RF beam is based at least in part on a beam index corresponding to the determined direction of arrival, the beam index being based at least in part on a beam synthesis process to determine an RF beam in a direction toward the WD. In some embodiments, determining an RF beam based at least in part on the determined direction of arrival is performed when a channel state information, CSI, is not available. In some embodiments, determining an RF beam based at least in part on the determined direction of arrival is performed when a P2 report from the WD is not received within an expected time slot, the P2 report indicating which of a plurality of RF beams is associated with the WD. In some embodiments, determining an RF beam based at least in part on the determined direction of arrival is performed when a P2 report from the WD is deemed to be unreliable, the P2 report indicating which of a plurality of RF beams is associated with the WD. In some embodiments, the P2 report is based at least in part on a downlink control information, DCI, format DCI_0_1. In some embodiments, the processing circuitry is further configured to adjust a margin of a link adaptation process based at least in part on reliability or noise level of a beam index estimation module. In some embodiments, the processing circuitry is further configured to switch an outer loop link adaptation process to conservative mode, where in the conservative mode, a signal to noise ratio, SNR, is not increased in response to receipt of a non-acknowledgment, NACK, from the WD. In some embodiments, the triggering is prior to entering a safe mode of operation.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
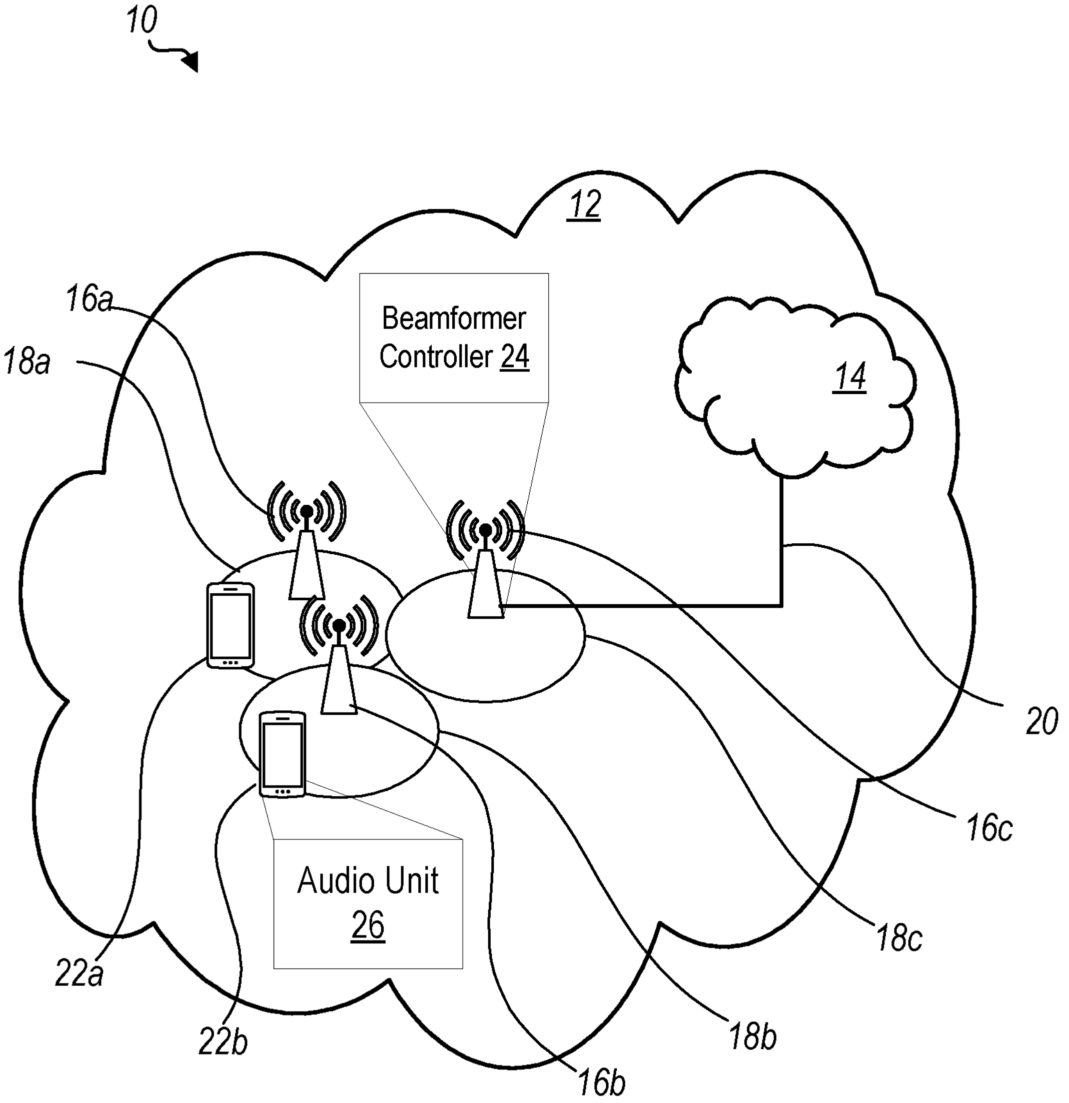
FIG. 1 is a schematic diagram of an example network architecture illustrating a communication system according to principles disclosed herein.

Before describing in detail exemplary embodiments, it is noted that the embodiments reside primarily in combinations of apparatus components and processing steps related to spatial audio assisted radio frequency (RF) beamforming for millimeter wave and Tera Hertz communications in safe mode. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The heterogenous beamforming architecture described herein may have any one or more features:

- prolongs the beamforming-based transmissions during safe mode operations where data signals can be continued to be provided using directional transmissions;
- Improves the direction of transmissions and/or receptions by combining the acoustics information obtained via microphone arrays;
- Does not require a licensed RF band or does not consume scarce resources during the safe mode operations. Since all estimation may be based on acoustics signals generated either by the user or mobile equipment, it is a low-cost solution and does not consume scarce RF resources;

Avoids RF hardware impairments deteriorating the direction estimation and may be free of RF calibration burden that is essential to get accurate RF beamforming information.

Can be used in combination with visually assisted beamforming techniques which can also be employed as part of safe mode procedures. In some cases, visual information may not be reliable due to lack of visible light not being able to penetrate trough non-transparent blocking objects.

Referring to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 (eNB or gNB) is configured to include a beamformer controller 24 configured to determine a direction of arrival of the at least one acoustic pulse received from a WD via a microphone array. A wireless device 22 is configured to include an audio unit 26 which is configured to transmit an audio signal.

Example implementations, in accordance with an embodiment, of the WD 22 and network node 16 discussed in the preceding paragraphs will now be described with reference to FIG. 2.

The communication system 10 includes a network node 16 provided in a communication system 10 and including hardware 28 enabling it to communicate with the WD 22. The hardware 28 may include a radio interface 30 for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves. In addition to the radio interface 30, the network node 16 also includes a microphone array 35 configured to receive acoustic signals. The radio interface 30 communicates over the air on a wireless connection 32, e.g., an RF link. The microphone array 35 senses audio frequency signals communicated over the air by wireless devices 22, shown in FIG. 2 as audio link 33.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include a beamformer controller 24 configured to determine a direction of arrival of the at least one acoustic pulse received from a WD via a microphone array.

The communication system 10 further includes the WD 22 already referred to. The WD 22 may have hardware 44 that may include a radio interface 46 configured to set up and maintain a wireless connection 32 with a network node 16 serving a coverage area 18 in which the WD 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22. For example, the processing circuitry 50 of the wireless device 22 may include an audio unit 26 which is configured to transmit an audio signal.

Figure 2:
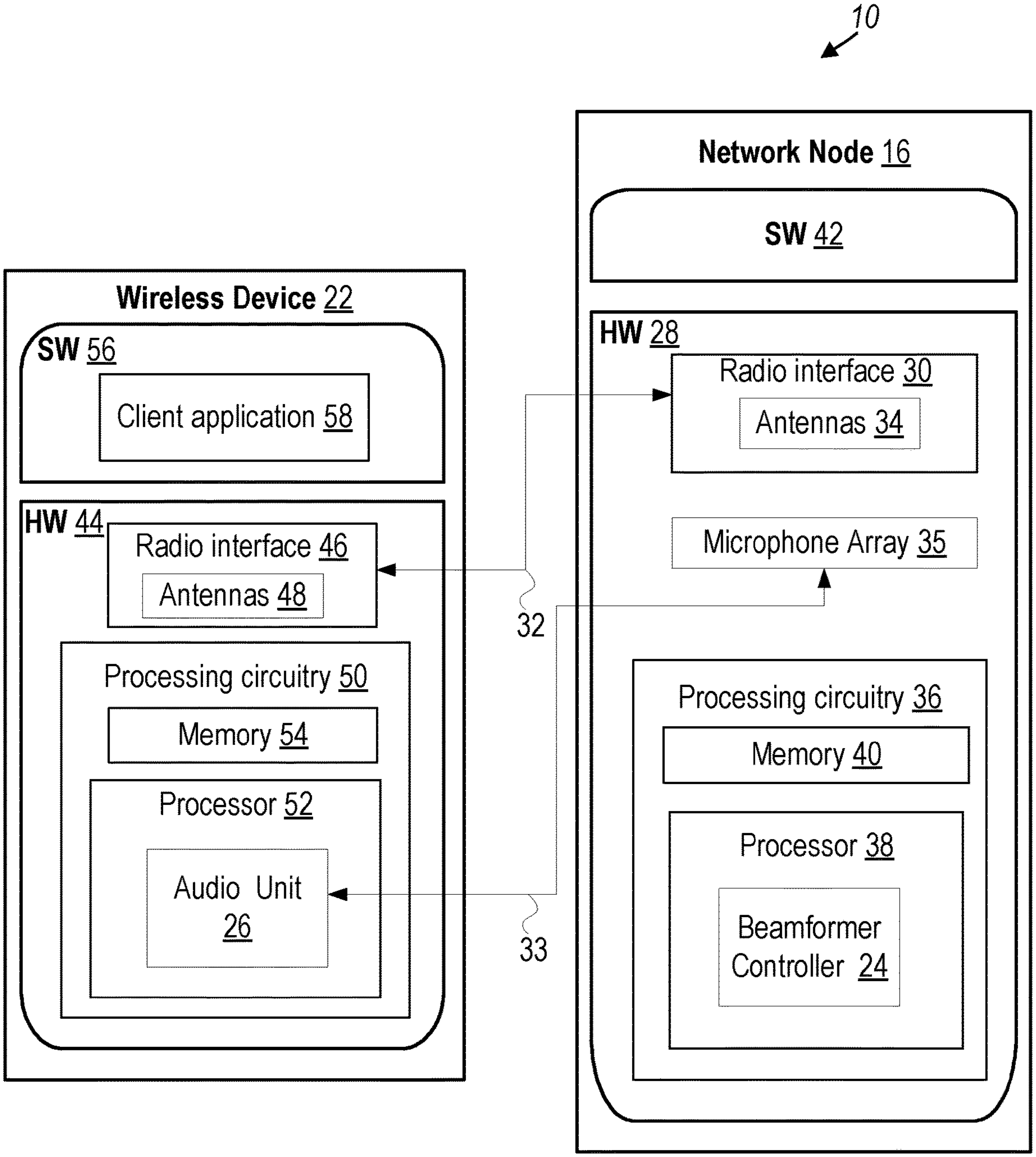
FIG. 2 is a block diagram of a network node in communication with a wireless device over a wireless connection according to some embodiments of the present disclosure.

In some embodiments, the inner workings of the network node 16 and WD 22 may be as shown in FIG. 2 and independently, the surrounding network topology may be that of FIG. 1.

The wireless connection 32 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as beamformer controller 24 and audio unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
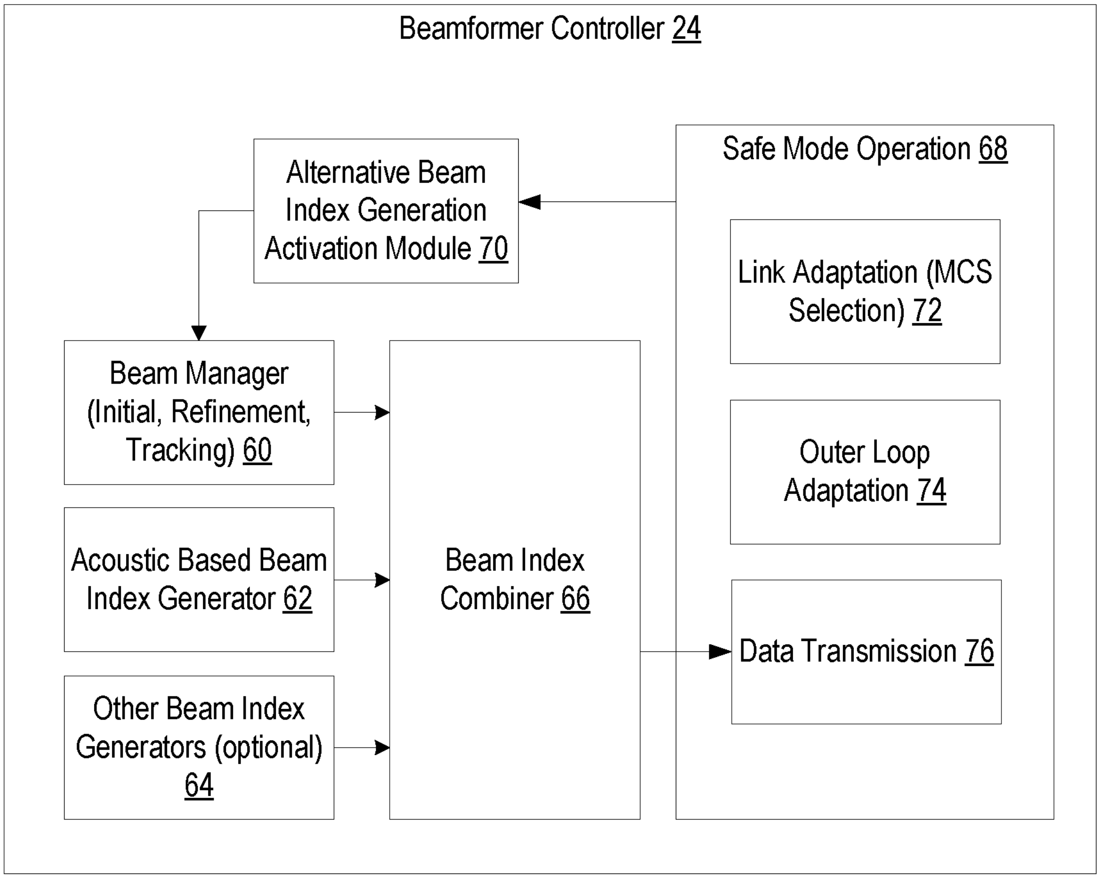
FIG. 3 is a block diagram of a beamformer controller constructed in accordance with principles disclosed herein.

FIG. 3 illustrates a block diagram for an audio-RF beamforming protocol which includes operations of the beamformer controller 24. The beamformer controller 24 may include a beam manager module 60 configured to perform initial beamforming or beam refinement and/or tracking. The beamformer controller 24 may also include an acoustic based beam index generation module 62 configured to determine a beam index based on acoustic signal direction. The beamformer controller 24 may also include other beam index generation modules 64, for example, video based beam index generation modules. The beam manager module 60, acoustic based beam index generation module 62, and any other optional beam index generation modules 64 may produce beam indices which may be input to a beam index combiner 66. The beamformer controller 24 may operate in a safe mode 68. Safe mode operation 68 may generate an activation signal to cause activation of alternative beam index generation 70. In safe mode operation 68, there may be performed, link adaptation 72 which may include selection of a modulation and coding scheme. Safe mode operation 68 may also include outer loop adaptation 74 and/or data transmission 76 which received input from the beam index combiner 66.

Figure 4:
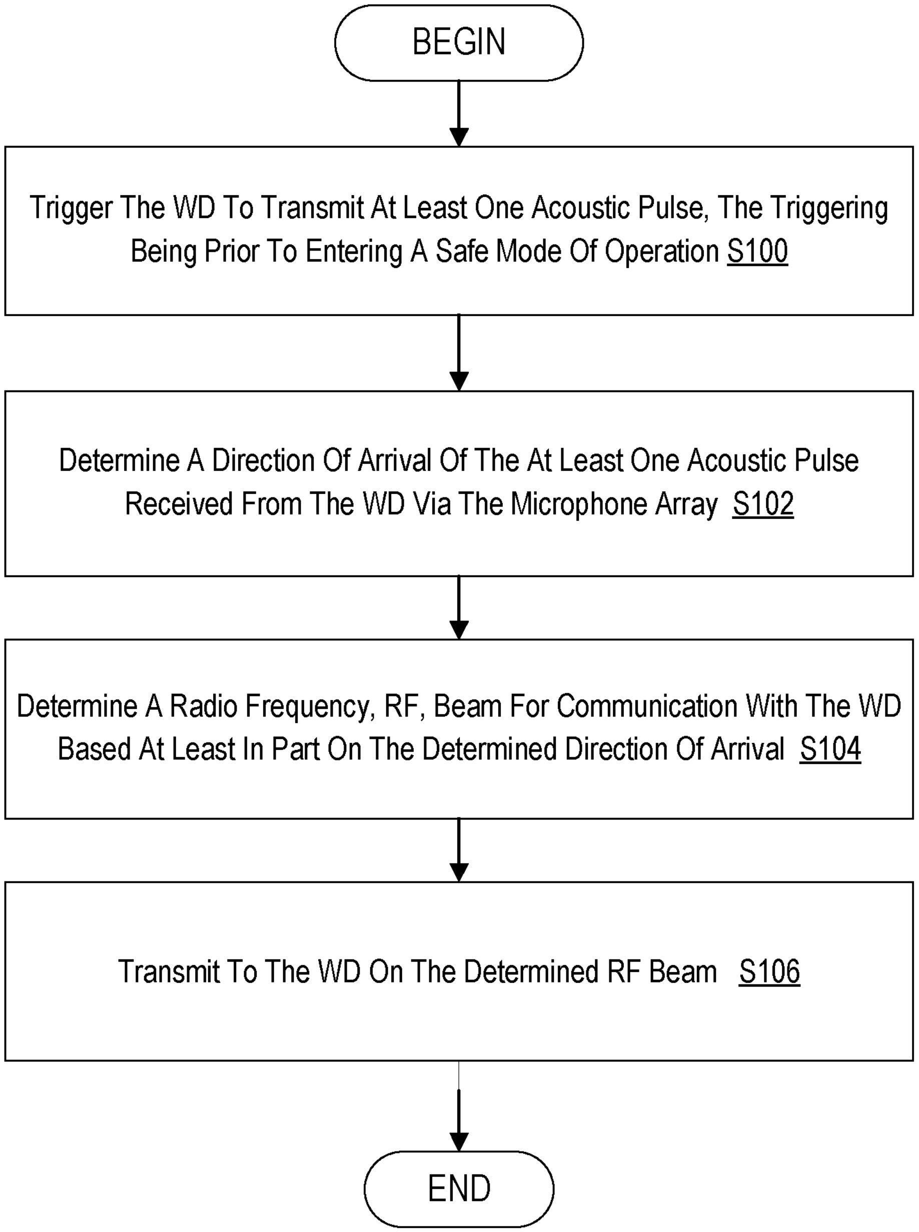
FIG. 4 is a flowchart of an example process in a network node for spatial audio assisted radio frequency (RF) beamforming for millimeter wave and Tera Hertz communications in safe mode according to some embodiments of the present disclosure.

FIG. 4 is a flowchart of an example process in a network node 16 for spatial audio assisted radio frequency (RF) beamforming for millimeter wave and Tera Hertz communications in safe mode. One or more blocks described herein may be performed by one or more elements of network node 16 such as by one or more of processing circuitry 36 (including the beamformer controller 24), processor 38, and/or radio interface 30. Network node 16 such as via processing circuitry 36 and/or processor 38 and/or radio interface 30 is configured to trigger the WD to transmit at least one acoustic pulse, the triggering being prior to entering a safe mode of operation (Block S100). The process also includes determining a direction of arrival of the at least one acoustic pulse received from the WD via a microphone array (Block S102). The process also includes determining a radio frequency, RF, beam for communication with the WD based at least in part on the determined direction of arrival (Block S104). The process further includes transmitting to the WD on the determined RF beam (Block S106).

Having described the general process flow of arrangements of the disclosure and having provided examples of hardware and software arrangements for implementing the processes and functions of the disclosure, the sections below provide details and examples of arrangements for spatial audio assisted radio frequency (RF) beamforming for millimeter wave and Tera Hertz communications in safe mode.

An acoustics-based approach for mmWave (or higher frequency) safe mode operations to continue regular uplink/downlink (UL/DL) transmissions using directional transmissions is provided. The approach described herein may be utilized in normal operation modes where a channel state information (CSI) report is not available due to UL bottle neck or lack of in-band temporal resources to collect the usual beam-refinement related reports. Some embodiments are implemented in a network node 16, which may be, for example, a gNB operating as a pico-cell or femto-cell in an indoor environment. A microphone array 35 may have a range of 200 meters, for example, and may operate at one or more audio frequencies that are greater than an audio frequency that can be heard by a human being. By supplementing beam forming in the safe mode, latencies can be reduced.

In a safe mode of operation, the network node 16 may not increase a signal to noise ratio when a hybrid automatic repeat request (HARQ) non-acknowledgement (NACK) is received.

Upon switching to safe mode operation 68 or upon detecting deterioration in a normal beam-refinement process, the network node 16 (e.g., a gNB), via processing circuitry 36 and/or radio interface 30, may send a transmission mode modification message to the radio interface 46 of the WD 22 via the user control plane (UPC). The network node 16 and may continue the communication as follows:

1. Use the fallback downlink control information (DCI) formats to send uplink and downlink data scheduling information to the WD 22;
2. For downlink beamformer estimation to be performed by processing circuitry and/36 or the radio interface 30, the network node 16 may obtain a first P2 report based on DCI_0_1. The first P2 report may include information concerning which beam corresponds to a particular WD 22. Such P2 reports may be received every 40 milliseconds;

a. If the P2 report is not received in the expected time slot, then the beam index indicated by acoustics-based beam index generator 62 may be used; or b. If the P2 report is available in parts or reliability of a report is low, a beam index may be generated based on acoustics processed by acoustic based beam index generator 62 and/or may be generated based on the beam index from a DCI report using a weighted average of steering vectors or strongest eigen vector of the weighted singular value decomposition (SVD) of steering vectors corresponding to directions of beams indicated by available beam-index information. Basing a beam index on such beam-index information may be performed by the beam index combiner 66;

The final beam-index may also be generated by alternative beam synthesis approaches based on numerical optimizations or array synthesis techniques; such approaches may be implemented by the processing circuitry 36 via, for example, by beamformer controller 24;

3. Apply a larger margin for the link-adaptation process 72 based on the reliability/noise levels of beam-index estimation modules 60, 62 and/or 64, the larger margin being greater than a margin for the link adaptation process in a normal mode of operation (i.e., not in safe mode).
4. If applicable, switch the outer-loop link adaptation 74 to conservative mode wherein a signal to noise ratio (SNR) is not increased in response to a hybrid automatic repeat request (HARQ) non-acknowledgement (NACK);

When the transmitter switches from safe mode operation 68 to normal operation after receiving a confirmation signal from the WD:

5. Continue to use the fallback or resume non-fallback DCI format for data transmission 76 while at the same time, use non-fallback DCI 0_1 format to trigger usual CSI estimation procedure;
6. After safe mode operations 68, beam refinement and tracking processes (e.g., P2 in 3GPP mmWave beam management protocol) may be performed by beam manager 60 by requesting aperiodic CSI reports from the wireless device 22; and/or
7. Resume normal link-adaptation procedures.

The radio interfaces 30 and 46 may exchange control messages to agree on triggering the acoustics beam acquisition procedure as an auxiliary method to be employed during safe mode operations 68.

In some embodiments, the acoustics protocol enables the transmission of spatial acoustic pulses from the receiver to the transmitter. Angle-of-arrival techniques are used to estimate the angle(s) of arrival(s) and this information may be mapped to a beam-index within the usual beam-management procedure. This acoustic protocol (process) may be triggered by an application layer application program interface (API) or built-in beam management protocol. The generation of an acoustic-assisted beam index may be performed as follows:

1. During normal operation or safe mode operation 68, trigger, via the processing circuitry 36 and/or radio interface 30, the WD 22 to send acoustic pulses;
2. Estimate, via the processing circuitry 36, a direction of arrival of acoustic pulses received by the microphone array 35;
3. Calculate, via the processing circuitry 36, audio interference and assign a signal quality to the directional of arrival estimation;
4. Map, via the processing circuitry 36 and/or the radio interface 30, estimated direction of arrival to the beam-index corresponding to the beam index that would be available in the usual (RF) beam management protocol;
5. In case the radio is in safe mode operation 68 or a beam refinement process is ceased, use an acoustic-based beam index;

The processing circuitry 36 and/or radio interface 30 may be configured to perform one or more of the following:

6. In case the radio has beam-index estimates performed by the processing circuitry 36 from a beam-refinement process having reduced liability as compared to a predetermined level of liability, then obtain the beam steering vector for each beam-index and merge beam index information into a single beam index based on:
   a. Weighted averaging of steering vectors; or
   b. Strongest eigenvector of the weighted SVD matrix of the steering matrix;
   c. A least squares or similar optimization based beam-synthesis method to determine the beam-index whose radiation pattern is closest to patterns available from beam-indices from in-band (usual CSI report) or out-of-band (audio assisted or visual assisted) originated beam indices;

The weights in above directions may be adjusted based on the reliability and/or noise levels in each beam-index estimation procedure; and/or 7. Provide the determined beam-index to a safe mode protocol beamformer generation module.

According to one aspect, a method for beamforming at a network node 16 configured to communicate with a plurality of WDs. The network node 16 has a microphone array 35. The method includes triggering a WD 22 to transmit at least one acoustic pulse and determining a direction of arrival of the at least one acoustic pulse received from the WD 22 via the microphone array 35. The method also includes determining a radio frequency, RF, beam for communication with the WD 22 based at least in part on the determined direction of arrival, and transmitting to the WD 22 on the determined RF beam.

According to this aspect, in some embodiments, the determined RF beam is based at least in part on a beam index corresponding to the determined direction of arrival, the beam index being based at least in part on a weighted average of beam steering vectors. In some embodiments, the determined RF beam is based at least in part on a beam index corresponding to the determined direction of arrival, the beam index being based at least in part on a largest eigenvector of a weighted singular value decomposition, SVD, matrix. In some embodiments, the determined RF beam is based at least in part on a beam index corresponding to the determined direction of arrival, the beam index being based at least in part on a beam synthesis process to determine an RF beam in a direction toward the WD 22. In some embodiments, determining an RF beam based at least in part on the determined direction of arrival is performed when a channel state information, CSI, is not available. In some embodiments, determining an RF beam based at least in part on the determined direction of arrival is performed when a P2 report from the WD 22 is not received within an expected time slot, the P2 report indicating which of a plurality of RF beams is associated with the WD 22. In some embodiments, determining an RF beam based at least in part on the determined direction of arrival is performed when a P2 report from the WD 22 is deemed to be unreliable, the P2 report indicating which of a plurality of RF beams is associated with the WD 22. In some embodiments, the P2 report is based at least in part on a downlink control information, DCI, format DCI_0_1. In some embodiments, the method also includes adjusting a margin of a link adaptation process based at least in part on a reliability or noise level of a beam index estimation module. In some embodiments, the method further includes switching an outer loop link adaptation process to conservative mode, where in the conservative mode, a signal to noise ratio, SNR, is not increased in response to receipt of a non-acknowledgment, NACK, from the WD 22. In some embodiments, the triggering is prior to entering a safe mode of operation.

According to another aspect, a network node 16 is configured to communicate with a plurality of WDs. The network node 16 includes a microphone array 35 configured to receive an acoustic pulse from a WD 22. The network node 16 also includes processing circuitry 36 configured to trigger the WD 22 to transmit at least one acoustic pulse, and determine a direction of arrival of the at least one acoustic pulse received from the WD 22 via the microphone array 35. The processing circuitry 36 is also configured to determine a radio frequency, RF, beam for communication with the WD 22 based at least in part on the determined direction of arrival. The network node 16 also includes a radio interface 30 configured transmit to the WD 22 on the determined RF beam.

According to this aspect, in some embodiments, the determined RF beam is based at least in part on a beam index corresponding to the determined direction of arrival, the beam index being based at least in part on a weighted average of beam steering vectors. In some embodiments, the determined RF beam is based at least in part on a beam index corresponding to the determined direction of arrival, the beam index being based at least in part on a largest eigenvector of a weighted singular value decomposition, SVD, matrix. In some embodiments, the determined RF beam is based at least in part on a beam index corresponding to the determined direction of arrival, the beam index being based at least in part on a beam synthesis process to determine an RF beam in a direction toward the WD 22. In some embodiments, determining an RF beam based at least in part on the determined direction of arrival is performed when a channel state information, CSI, is not available. In some embodiments, determining an RF beam based at least in part on the determined direction of arrival is performed when a P2 report from the WD 22 is not received within an expected time slot, the P2 report indicating which of a plurality of RF beams is associated with the WD 22. In some embodiments, determining an RF beam based at least in part on the determined direction of arrival is performed when a P2 report from the WD 22 is deemed to be unreliable, the P2 report indicating which of a plurality of RF beams is associated with the WD 22. In some embodiments, the P2 report is based at least in part on a downlink control information, DCI, format DCI_0_1. In some embodiments, the processing circuitry 36 is further configured to adjust a margin of a link adaptation process based at least in part on reliability or noise level of a beam index estimation module. In some embodiments, the processing circuitry 36 is further configured to switch an outer loop link adaptation process to conservative mode, where in the conservative mode, a signal to noise ratio, SNR, is not increased in response to receipt of a non-acknowledgment, NACK, from the WD 22. In some embodiments, the triggering is prior to entering a safe mode of operation.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for beamforming at a network node configured to communicate with a plurality of wireless device, WDs, the network node having a microphone array, the method comprising:

triggering a WD to transmit at least one acoustic pulse;

determining a direction of arrival of the at least one acoustic pulse received from the WD via the microphone array;

determining a radio frequency, RF, beam for communication with the WD based at least in part on the determined direction of arrival, determining an RF beam based at least in part on the determined direction of arrival is performed one or both: when a P2 report from the WD is not received within an expected time slot, the P2 report indicating which of a plurality of RF beams is associated with the WD; and when a P2 report from the WD is deemed to be unreliable, the P2 report indicating which of a plurality of RF beams is associated with the WD; and transmitting to the WD on the determined RF beam.

2. The method of claim 1, wherein the determined RF beam is based at least in part on a beam index corresponding to the determined direction of arrival, the beam index being based at least in part on a weighted average of beam steering vectors.

3. The method of claim 1, wherein the determined RF beam is based at least in part on a beam index corresponding to the determined direction of arrival, the beam index being based at least in part on a largest eigenvector of a weighted singular value decomposition, SVD, matrix.

4. The method of claim 1, wherein the determined RF beam is based at least in part on a beam index corresponding to the determined direction of arrival, the beam index being based at least in part on a beam synthesis process to determine an RF beam in a direction toward the WD.

5. The method of claim 1, wherein determining an RF beam based at least in part on the determined direction of arrival is performed when a channel state information, CSI, is not available.

6. The method of claim 1, wherein the P2 report is based at least in part on a downlink control information, DCI, format DCI_0_1.

7. The method of claim 1, further comprising adjusting a margin of a link adaptation process based at least in part on a reliability or noise level of a beam index estimation module.

8. The method of claim 1, further comprising switching an outer loop link adaptation process to conservative mode, where in the conservative mode, a signal to noise ratio, SNR, is not increased in response to receipt of a non-acknowledgment, NACK, from the WD.

9. The method of claim 1, wherein the triggering is prior to entering a safe mode of operation.

10. A network node configured to communicate with a plurality of wireless device, WDs, the network node comprising:

a microphone array configured to receive an acoustic pulse from a WD;

processing circuitry configured to:

trigger the WD to transmit at least one acoustic pulse;

determine a direction of arrival of the at least one acoustic pulse received from the WD via the microphone array; and determine a radio frequency, RF, beam for communication with the WD based at least in part on the determined direction of arrival, determining an RF beam based at least in part on the determined direction of arrival is performed one or both:

when a P2 report from the WD is not received within an expected time slot, the P2 report indicating which of a plurality of RF beams is associated with the WD; and when a P2 report from the WD is deemed to be unreliable, the P2 report indicating which of a plurality of RF beams is associated with the WD; and a radio interface configured transmit to the WD on the determined RF beam.

11. The network node of claim 10, wherein the determined RF beam is based at least in part on a beam index corresponding to the determined direction of arrival, the beam index being based at least in part on a weighted average of beam steering vectors.

12. The network node of claim 10, wherein the determined RF beam is based at least in part on a beam index corresponding to the determined direction of arrival, the beam index being based at least in part on a largest eigenvector of a weighted singular value decomposition, SVD, matrix.

13. The network node of claim 10, wherein the determined RF beam is based at least in part on a beam index corresponding to the determined direction of arrival, the beam index being based at least in part on a beam synthesis process to determine an RF beam in a direction toward the WD.

14. The network node of claim 10, wherein determining an RF beam based at least in part on the determined direction of arrival is performed when a channel state information, CSI, is not available.

15. The network node of claim 10, wherein the P2 report is based at least in part on a downlink control information, DCI, format DCI_0_1.

16. The network node of claim 10, wherein the processing circuitry is further configured to adjust a margin of a link adaptation process based at least in part on reliability or noise level of a beam index estimation module.

17. The network node of claim 10, wherein the processing circuitry is further configured to switch an outer loop link adaptation process to conservative mode, where in the conservative mode, a signal to noise ratio, SNR, is not increased in response to receipt of a non-acknowledgment, NACK, from the WD.

18. The network node of claim 10, wherein the triggering is prior to entering a safe mode of operation.

* * * * *